US012269271B2

(12) United States Patent
Sato et al.

(10) Patent No.: US 12,269,271 B2
(45) Date of Patent: Apr. 8, 2025

(54) LIQUID DISCHARGE HEAD AND METHOD OF MANUFACTURING THE LIQUID DISCHARGE HEAD

(71) Applicant: CANON KABUSHIKI KAISHA, Tokyo (JP)

(72) Inventors: Motoaki Sato, Tokyo (JP); Junichiro Iri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 18/188,372

(22) Filed: Mar. 22, 2023

(65) Prior Publication Data

US 2023/0347654 A1 Nov. 2, 2023

(30) Foreign Application Priority Data

Apr. 28, 2022 (JP) ................................ 2022-074667

(51) Int. Cl.
*B41J 2/175* (2006.01)

(52) U.S. Cl.
CPC ....... *B41J 2/17523* (2013.01); *B41J 2/17556* (2013.01); *B41J 2/17559* (2013.01)

(58) Field of Classification Search
CPC ........................ B41J 2/17513; B41J 2/17523; B41J 2/17556; B41J 2/17559
See application file for complete search history.

(56) References Cited

FOREIGN PATENT DOCUMENTS

| | | | | | |
|---|---|---|---|---|---|
| CH | 691228 A5 | * | 5/2001 | .......... | B41J 2/17506 |
| JP | 2000127454 A | | 5/2000 | | |
| JP | 2012111143 A | * | 6/2012 | | |
| JP | 6115080 B2 | * | 4/2017 | ............. | B41J 2/175 |

* cited by examiner

*Primary Examiner* — Sharon Polk
(74) *Attorney, Agent, or Firm* — Canon U.S.A., Inc. IP Division

(57) ABSTRACT

A liquid discharge head includes i) a recording-element substrate configured to discharge a liquid, ii) a cuboid-like liquid tank configured to support the recording-element substrate and to store the liquid to be discharged from the recording-element substrate, and iii) an absorbent accommodated in a compressed state in the liquid tank and configured to absorb and hold the liquid. In the liquid discharge head, multiple projections are formed on a bottom of the liquid tank. In addition, as viewed in plan in a direction orthogonal to the bottom, the projections are disposed so as to surround or straddle an injection position at which the liquid is injected into the absorbent using an injection needle.

17 Claims, 4 Drawing Sheets

LIQUID DISCHARGE HEAD AND METHOD OF MANUFACTURING THE LIQUID DISCHARGE HEAD

BACKGROUND

Field of the Disclosure

The present disclosure relates to a liquid discharge head and a method of manufacturing the liquid discharge head.

Description of the Related Art

A type of a liquid discharge head that performs image recording by discharging a liquid, such as ink, includes a liquid tank for storing the liquid as an integral part of the liquid discharge head. The liquid tank accommodates an absorbent that absorbs and holds the liquid therein. In manufacturing the liquid discharge head, the tact time of injecting the liquid into the liquid tank is demanded to decrease in order to reduce the manufacturing cost. One solution to this is to increase injection speed of the liquid. However, when the liquid is injected at a speed exceeding the absorbing ability of the absorbent, an excessive amount of the liquid not absorbed by the absorbent may creep up side walls of the liquid tank and flow out due to capillary forces occurring between the absorbent and the liquid tank. Japanese Patent Laid-Open No. 2000-127454 discloses a technique in which multiple projections are formed on the entire bottom of a waste-liquid tank to form a predefined gap between the bottom and the absorbent. With this technique, the gap is expected to temporarily store the excessive amount of the liquid not absorbed by the absorbent when the liquid is injected at a high speed.

However, when the technique disclosed by Japanese Patent Laid-Open No. 2000-127454 was applied to the case of high speed injection of the liquid, the technique was sometimes not able to deal with the problem of the liquid creeping up the side walls of the liquid tank when the liquid was injected at a high speed. Moreover, there was a case where the absorbent did not fully absorb the temporarily stored liquid in the subsequent process. If the excessive liquid not absorbed by the absorbent remains in the liquid tank, the liquid in the liquid tank cannot be fully consumed. Moreover, negative pressure in the liquid tank cannot be maintained appropriately, which may lead to defective ink discharge.

SUMMARY OF THE DISCLOSURE

The present disclosure provides a liquid discharge head that can improve the product reliability while reducing the manufacturing cost and a method of manufacturing the liquid discharge head.

The present disclosure provides a liquid discharge head that includes i) a recording-element substrate configured to discharge a liquid, ii) a cuboid-like liquid tank configured to support the recording-element substrate and to store the liquid to be discharged from the recording-element substrate, and iii) an absorbent accommodated in a compressed state in the liquid tank and configured to absorb and hold the liquid. In the liquid discharge head, multiple projections are formed on a bottom of the liquid tank. In addition, as viewed in plan in a direction orthogonal to the bottom, the projections are disposed so as to surround or straddle an injection position at which the liquid is injected into the absorbent using an injection needle. According to another aspect of the present disclosure, in the above liquid discharge head, a puncture is present on a surface of the absorbent positioned opposite to a surface of the absorbent facing a bottom of the liquid tank. The puncture is formed due to an injection needle for injecting the liquid into the liquid tank being inserted into the absorbent. In addition, multiple projections are formed on the bottom of the liquid tank. As viewed in plan in a direction orthogonal to the bottom, the projections are disposed so as to surround or straddle the puncture.

The present disclosure also provides a method of manufacturing a liquid discharge head. The method includes i) providing a cuboid-like liquid tank configured to support a recording-element substrate that discharges a liquid and configured to store the liquid to be discharged from the recording-element substrate, ii) installing an absorbent in a compressed state into the liquid tank, the absorbent being configured to absorb and hold the liquid, and iii) inserting an injection needle into the absorbent and injecting the liquid through the injection needle into the liquid tank. The providing the liquid tank includes a step of forming multiple projections on a bottom of the liquid tank at positions surrounding or straddling a position at which the injection needle is to be inserted in the absorbent as viewed in plan in a direction orthogonal to the bottom.

Further features of the present disclosure will become apparent from the following description of exemplary embodiments with reference to the attached drawings.

DESCRIPTION OF THE EMBODIMENTS

An embodiment of the present disclosure will be described with reference to the drawings.

Figure 1:
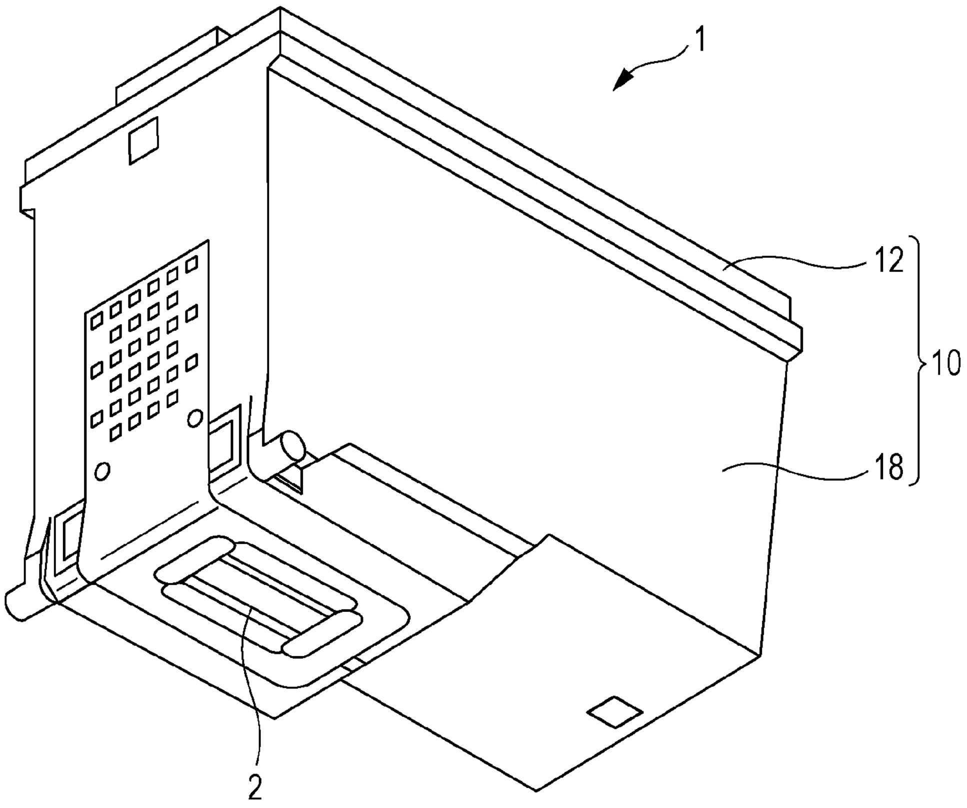
FIG. 1 is a perspective view illustrating a liquid discharge head according to an embodiment of the present disclosure.

FIG. 1 is a perspective view illustrating a liquid discharge head 1 according to the embodiment of the present disclosure.

The liquid discharge head 1 is configured to print an image on a record medium by discharging a liquid, such as ink. The liquid discharge head 1 includes a recording-element substrate 2 that discharges the liquid and a liquid tank 10 that supports the recording-element substrate 2 and stores the liquid to be discharged. The liquid tank 10 includes a tank body 11 that is shaped like a cuboid of which the top face is open and a cover member 12 that is welded to the tank body 11 so as to close the opening of the tank body 11. An absorbent 3 for absorbing the liquid, which will be described later, is accommodated in the liquid tank 10.

Figure 2A:
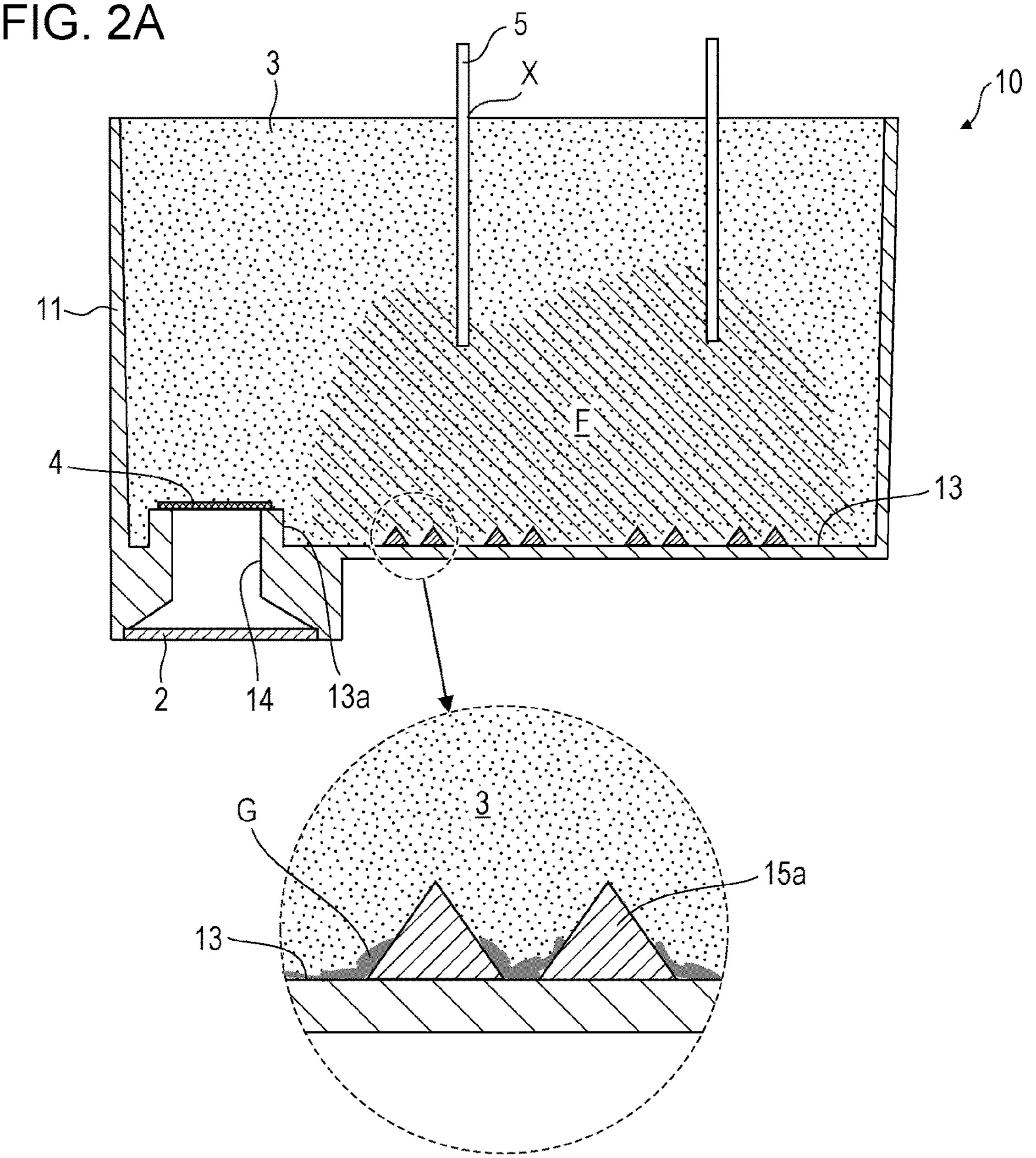
FIG. 2A is a schematic cross-sectional view illustrating the liquid discharge head, as well as a close up of the tank bottom, according to an embodiment of the present disclosure.
Figure 2B:
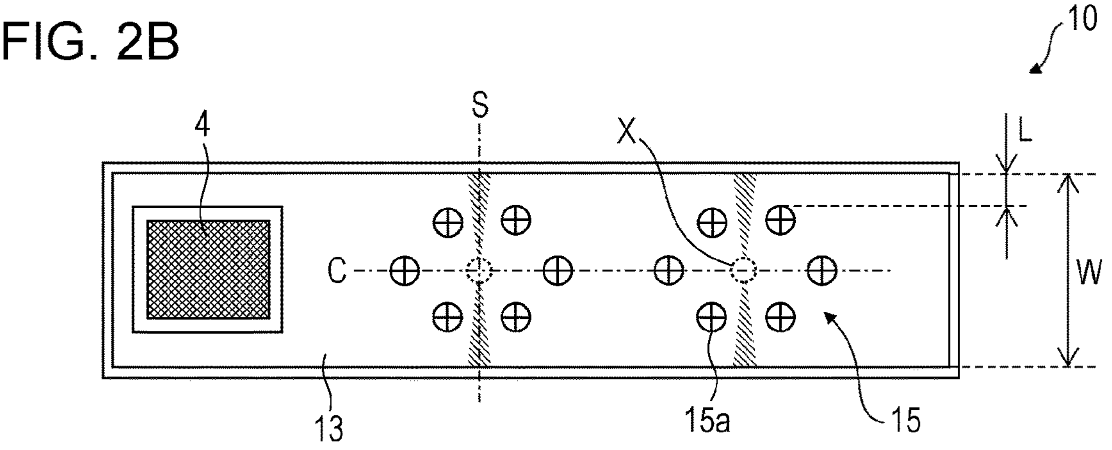
FIG. 2B is a schematic plan view illustrating a bottom view of the liquid discharge head, according to an embodiment of the present disclosure.

FIG. 2A is a schematic cross-sectional view of the liquid discharge head 1 of the present embodiment, illustrating a state of the liquid tank 10 to which the liquid is being injected. FIG. 2B is a schematic plan view illustrating the bottom of the liquid discharge head 1 of the present embodiment when the inside of the liquid tank 10 is viewed in the direction orthogonal to the bottom. Note that in FIG. 2B, the illustrations of the cover member and the absorbent are omitted to facilitate better understanding of the bottom structure.

The liquid discharge head 1 includes the absorbent 3 and a filter 4 inside the liquid tank 10. The absorbent 3 is made, for example, of polypropylene (PP) fiber, polyethylene (PE) fiber, a composite of PP and PE fibers, or urethane form. When the absorbent 3 is inserted into the liquid tank 10, a pressing rib (not illustrated) formed on the inside surface of the cover member 12 presses the absorbent 3, and the absorbent 3 is installed in the liquid tank 10 in a compressed state. The absorbent 3 is configured to hold the liquid in the liquid tank 10 and to apply a negative pressure to the liquid. The filter 4 is disposed at the opening of a channel 14 that opens at a bottom 13 (or otherwise referred to as a "tank bottom 13") of the liquid tank 10. The liquid is supplied from the liquid tank 10 to the recording-element substrate 2 through the channel 14, and the filter 4 is configured to capture foreign matter, such as dust, at the opening of the channel 14. A projection group 15 consisting of multiple projections **15*a* are formed on the tank bottom 13. The projection group 15 is disposed at each liquid injection position X at which an injection needle 5 injects the liquid into the absorbent 3, which will be described later in detail. The structure of the projection group 15** and the advantageous effect thereof will also be described later in detail.

The liquid is injected into the liquid tank 10 in the following manner. The absorbent 3 is installed in the tank body 11 in the compressed state, and subsequently multiple injection needles 5 are inserted into the absorbent 3. A liquid F is injected into the tank body 11 using the injection needles 5, and the absorbent 3 absorbs, and thereby holds, the liquid F. After a predetermined amount of the liquid F is injected, the injection needles 5 are pulled out from the absorbent 3, and the cover member 12 is welded to the opening of the tank body 11. Thus, the liquid discharge head 1 in which the liquid tank 10 containing the liquid F is integrated is produced.

In this liquid injection process, if the absorbent 3 is disposed in the tank body 11 tightly and the liquid is injected at a speed exceeding the absorbing ability of the absorbent 3, an excessive amount of the liquid that the absorbent 3 cannot take up may pose a problem. In other words, the excessive amount of the liquid not absorbed by the absorbent 3 may move due to capillary forces occurring between the absorbent 3 and the liquid tank 10 and may creep up the walls of the liquid tank 10 and flow out. To solve this problem, multiple projections may be formed on the entire bottom of the tank to provide a gap between the absorbent and the bottom as described in Japanese Patent Laid-Open No. 2000-127454, which discloses a technique to prevent waste ink from flowing out of a waste-ink tank. The excessive amount of the liquid not absorbed by the absorbent may be temporarily stored in the gap in this manner. In an ink injection process, however, ink is injected into an ink tank much more rapidly compared with the discharge of waste ink into the waste-ink tank, which causes overflow of ink in the case of the waste-ink tank. Accordingly, the adoption of the arrangement of the projections of the waste-ink tank does not necessarily lead to a solution to the problem.

In the present embodiment, the projection group 15 consisting of multiple projections **15*a* is formed in a specific region on the tank bottom 13. In other words, as illustrated in FIG. 2B, the projection group 15 is disposed so as to surround or straddle an injection position X at which each injection needle 5 injects the liquid into the absorbent 3 as viewed in plan in the direction orthogonal to the tank bottom 13. As illustrated in the partially enlarged view of FIG. 2A, the projection group 15 forms a void space G between the absorbent 3 and the tank bottom 13. The void space G can serve as a buffering space to temporarily store the excessive amount of the liquid not absorbed by the absorbent 3** when ink is injected at a high speed.

The term "void space" as used herein includes not only a space formed between the tank bottom 13 and the absorbent 3 that is raised by the projections **15*a* but also a space formed at the bottom of each projection 15*a* due to the deformation of the absorbent 3 as illustrated in FIG. 2A. Note that the injection position X to which the injection needle 5 is inserted into the absorbent 3 can be identified by a puncture formed by the injection needle 5 on the upper surface of the absorbent 3 (a surface opposite to the surface facing the tank bottom 13**).

Thus, in the present embodiment, the projection group 15 is disposed in such a manner as to control the formation of the void space G between the absorbent 3 and the tank bottom 13. As a result, the excessive amount of the liquid not absorbed by the absorbent 3 can be temporarily stored in the void space G. The excessive amount of the liquid gradually spreads in the absorbent 3, and the absorbent 3 absorbs almost all the liquid during post-injection processes, such as a recovery process after injection and a product inspection process. The void space G formed in the controlled manner provides such a buffering effect as to sufficiently suppress the overflow of the liquid from the liquid tank 10 and simultaneously reduces the likelihood of free ink being present in the liquid tank 10 until after the post-injection processes. This can reduce the amount of a residual liquid left after the liquid in the liquid tank 10 is finished, and also can reduce the occurrence of defective ink discharge, which can improve the product reliability while reducing the manufacturing cost. Note that the void space G can be such a space as to generate capillary forces insofar as the above effect can be provided. In other words, the void space G can be a space that controls the capillary forces so as to provide the above effect.

The positions at which the projections **15*a* are disposed are not specifically limited insofar as the projections 15*a* surround or straddle the liquid injection position X as viewed in plan. For example, the positions can be determined appropriately in accordance with the type of material or the compressive state of the absorbent 3 or the viscosity or the surface tension of the liquid. In the case of the tank bottom 13 having a rectangular shape as in the drawings, the distance between the liquid injection position X and the side walls of the liquid tank 10 is small in the transverse direction. Accordingly, the liquid is more likely to reach the side walls of the liquid tank 10. Accordingly, the liquid injection position X can be farthest away from the side walls of the liquid tank 10. In other words, the liquid injection position X can be set at the center of the absorbent 3 in the transverse direction of the tank bottom 13. The projections 15*a* are preferably not disposed on a straight line S that passes through the injection position X so as to be parallel to the transverse direction of the tank bottom 13. More preferably, the projections 15*a* are not disposed in a region of ±5 degrees from the straight line S with the injection position X being at the center (in the hatched region in FIG. 2B). This can reduce the likelihood of the liquid in the void space G approaching the side walls of the liquid tank 10 and thereby effectively reduces the likelihood of the liquid flowing out of the liquid tank 10**.

Even if the projections 15*a* are disposed outside the region of the ±5 degrees from the straight line S passing through the injection position X, the formation of the void space G cannot be controlled appropriately if the projections 15*a* are positioned too closely to the side walls of the liquid tank 10. Accordingly, as illustrated in FIG. 2B, when the distance between a projection 15*a* positioned most closely to a side wall of the liquid tank 10 and the side wall is denoted by L and the width (the length in the transverse direction) of the tank bottom 13 is denoted by W, the position of the projection 15*a* preferably satisfies $L \geq W/9$, and more preferably satisfies $L=W/8$. As a result, the formation of the void space G can be controlled reliably, which enables reliable liquid injection without causing defects, such as the overflow of the liquid, even if the liquid is injected at a high speed.

In the case of the tank bottom 13 having a square shape, the projections 15*a* can be disposed radially with the liquid injection position X being at the center. However, this does not need to apply to the case where the liquid injection position X is positioned sufficiently away from the side walls of the liquid tank 10 as viewed in plan.

In the liquid injection process, if the injection needle 5 is inserted closely to the tank bottom 13 and the liquid is injected, the liquid reaches the void space G more quickly compared with the case where the injection needle 5 is inserted to a position farther away from the tank bottom 13. In this case, the void space G is filled with the liquid before the absorbing ability of the absorbent 3 recovers, and the void space G cannot provide a sufficient buffering effect, which increases the likelihood of the liquid overflow. Accordingly, the injection needle 5 is not inserted too closely to the tank bottom 13. For the same reason, the projection 15*a* is not formed directly below the liquid injection position X, in other words, not formed at the position overlapping the liquid injection position X as viewed in plan.

The shape of each projection 15*a* is not specifically limited, but can be such a shape that does not increase the insertion resistance when the absorbent 3 is inserted in the tank body 11. In other words, the projection 15*a* can have a shape of which the cross-sectional area increases from the top to the bottom. For example, the projection 15*a* can have a shape like a cone or a pyramid.

The dimensions of the projection 15*a* are not specifically limited but can be such that the projection 15*a* has a large contact area with the absorbent 3 so that the absorbent 3 can absorb the liquid in the void space G rapidly when the absorbing ability of the absorbent 3 recovers. For example, in the case of the projection 15*a* having a conical shape, the diameter of the bottom is approximately 0.2 to 1.0 mm. The height of the projection 15*a* from the tank bottom 13 is smaller than the height of a step 13*a* between the filter 4 and the tank bottom 13. For example, the height of the projection 15*a* is approximately 0.1 to 1.2 mm. If the projections 15*a* are too high, the void space G becomes excessively large, and the absorbent 3 is not pressed against the filter 4 appropriately when the absorbent 3 is inserted in the tank body 11. In this case, the absorbent 3 may not absorb free ink appropriately, and a relatively large amount of the free ink may remain in the void space G until the post-injection processes.

In the case where a sufficient number of projections 15*a* cannot be formed due to the area of the tank bottom 13 being small, a liquid-philic treatment is performed on the surface of at least one of the projections 15*a* to increase the amount of the liquid staying at the projection 15*a*. For example, a liquid-philic substance that does not affect the properties of the liquid can be deposited on the surface of the projection 15*a*, or ultra-violet (UV) treatment can be performed to increase the wettability of the surface of the projection 15*a*. In this case, only the wettability of the surface of the projection 15*a* is increased without increasing the wettability of the tank bottom 13, or the wettability of the surface of the projection 15*a* is increased relative to the wettability of the tank bottom 13. If the wettability of the tank bottom 13 is increased, the liquid may move easily along the tank bottom 13 from the surface of the projection 15*a*. Note that the projection group 15 can be disposed when the tank body 11 is formed or the projection group 15 can be disposed by adhering a liquid-resistant member after the tank body 11 is formed.

Figure 3A:
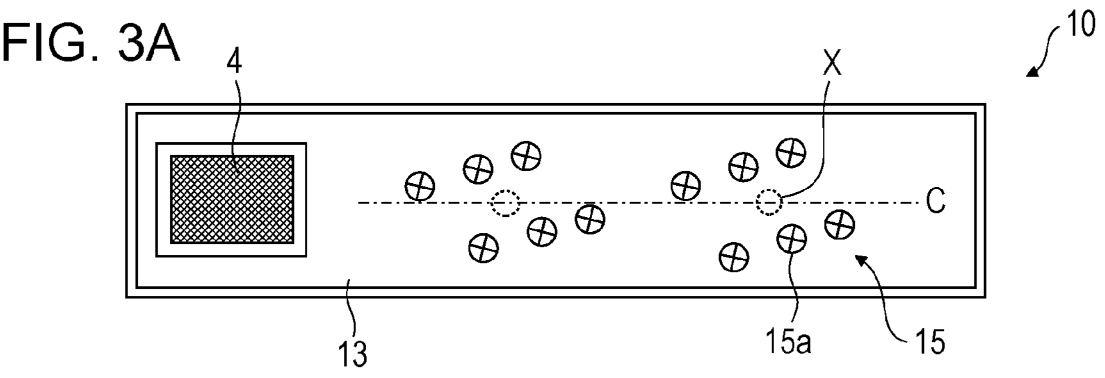
FIGS. 3A to 3D are schematic plan views illustrating various modifications of a projection group disposed on the bottom of the liquid discharge head, according to an embodiment of the present disclosure.

FIGS. 3A to 3D are plan views illustrating modifications of the projection group of the present embodiment. FIG. 4A is a perspective view illustrating a modification of the projection of the present embodiment, and FIG. 4B is a plan view of the modification of the projection.

As described above, the positions of the projections 15*a* are not specifically limited insofar as the distance between the projection 15*a* positioned most closely to a side wall of the liquid tank 10 and the side wall is greater than a predetermined distance. In the example illustrated in FIG. 2B, the projections 15*a* are formed at symmetrical positions with respect to the center line C of the tank bottom 13 extending in the longitudinal direction thereof. The projections 15*a*, however, can be disposed asymmetrically with respect to the center line C as illustrated in FIG. 3A.

Figure 3B:
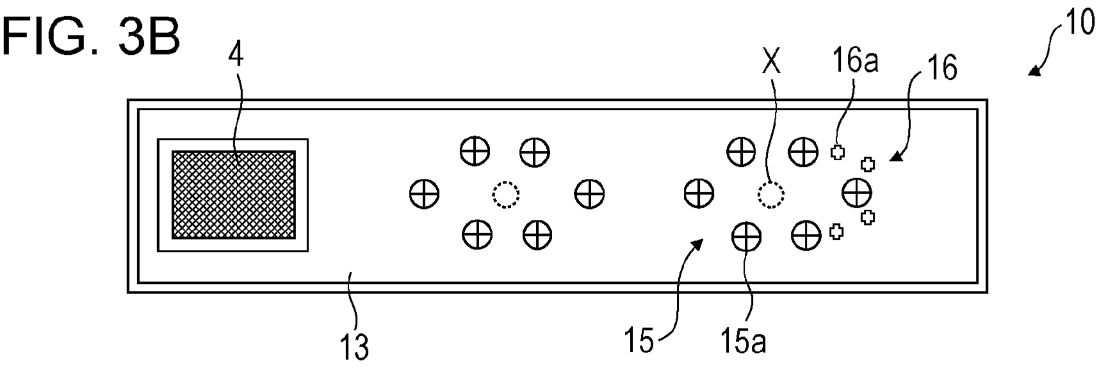
Figure 3C:
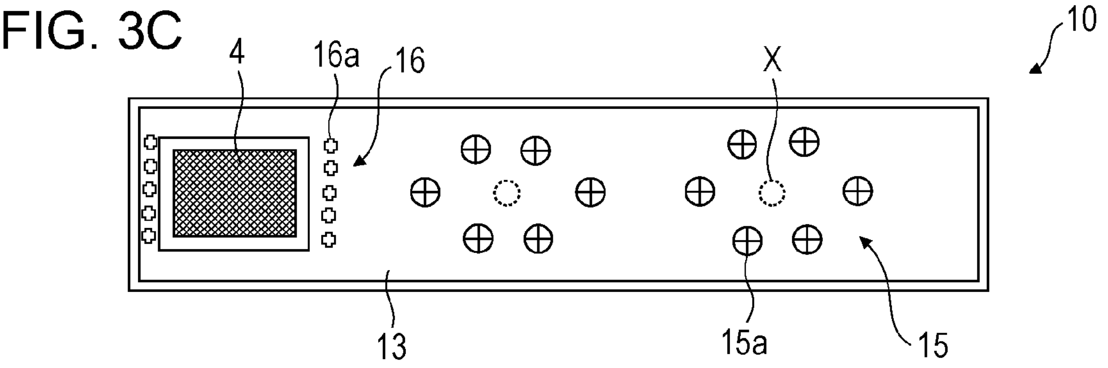
Figure 4A:
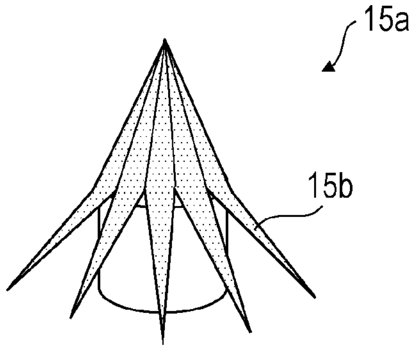
FIG. 4A is a schematic perspective view illustrating a modification of a projection according to an embodiment of the present disclosure.
Figure 4B:
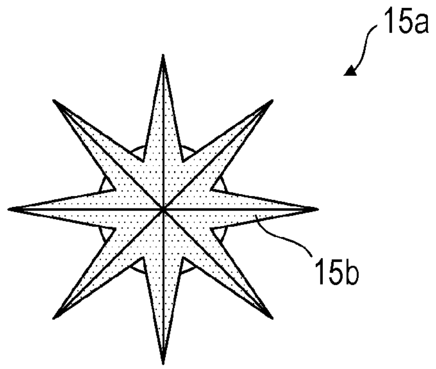
FIG. 4B is a schematic plan view of the projection, according to the embodiment of the present disclosure.

Alternatively, as illustrated in FIGS. 3B and 3C, a small-projection group 16 can be provided in addition to the projections 15*a*. The small-projection group 16 includes multiple small projections (other projections) 16*a* each having a size smaller than the projection 15*a*. In this case, as illustrated in FIG. 3B, the small-projection group 16 is formed at a side opposite to the side on which the filter 4 is disposed with respect to the projection group 15. The small-projection group 16 controls the flow of the liquid toward the side opposite to the filter 4. This can reduce the likelihood of a large amount of the liquid flowing to a position farther away from the filter 4 in the absorbent 3, leading to a reduction in the amount of a residual liquid left after the liquid in the liquid tank 10 is finished. For the same reason, the small-projection group 16 can be disposed around the filter 4 as illustrated in FIG. 3C to move a more amount of the liquid toward the filter 4. Note that the shape and dimensions of each small projection 16*a* is not specifically limited. For example, the small projection 16*a* illustrated in FIG. 3B is shaped like a circular column having an approximate diameter of 0.5 mm.

Figure 3D:
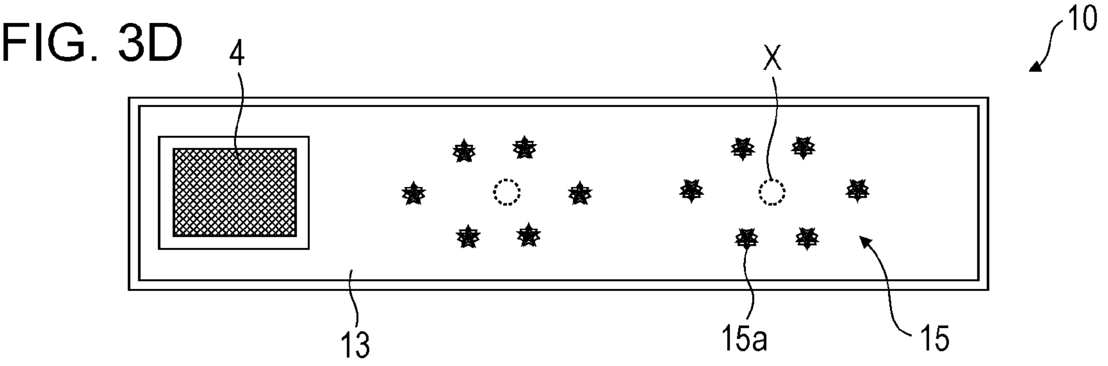

In order to form the void space G accurately between the absorbent 3 and the tank bottom 13, projections 15*a* each having irregularities on the surface can be provided as illustrated in FIG. 3D. Alternatively, projections 15*a* each having barbs 15*b* as illustrated in FIGS. 4A and 4B can be provided. This improves the engagement between the absorbent 3 and the projections 15*a*. When the absorbent 3 is inserted in the tank body 11 using a tool and the tool is pulled out of the tank body 11, part of the absorbent 3 may move in that direction. These projections 15*a*, however, reduce the likelihood of the part of the absorbent 3 moving and thereby reduce the likelihood of the void space G deviating from the desired dimensions. The irregularities are not specifically limited insofar as the surface of each projection 15*a* is rough enough so that the void space G can be formed and the deviation of the absorbent 3 does not occur easily. The irregularities can be dimples or grooves.

Next, advantageous effects of the liquid discharge head of the present disclosure will be described with reference to examples.

Example 1

In Example 1, the liquid discharge head 1 illustrated in FIG. 3A was prepared. The tank bottom 13 of the liquid tank 10 had a width W (transversal length) of 18 mm. Each of the projections 15*a* was shaped like a cone having a bottom diameter of 2 mm and a height of 1.0 mm. The projections 15*a* were formed when the tank was formed. The projection groups 15 were disposed in the following manner. In each projection group 15, three projections 15*a* were arranged so as to form a straight line, in which the distance between adjacent projections 15*a* was 4 mm and the distance L between the projection 15*a* closest to a side wall of the liquid tank 10 and the side wall was 2 mm. Accordingly, each projection group 15 satisfies the relation L=W/9. Note that the projection group 15 in Examples 2 to 5 also satisfies this relation, detailed descriptions of which are omitted. The injection needle 5 was inserted vertically into the absorbent 3 to a position 15 mm above the tank bottom 13, and an amount of 12 g of the liquid was pressure-injected in 1.0 second.

Image recording was performed using the above liquid discharge head 1, and an amount of 90% or more of the total liquid was consumed up. No overflow of the liquid from tank body 11 was observed during the liquid injection.

Example 2

In the present example, the liquid discharge head 1 illustrated in FIG. 3B was prepared. The liquid tanks 10 in Example 1 and Example 2 were the same except that the projections 15*a* were arranged differently and small projections 16*a* were provided in Example 2. The small projections 16*a* were disposed on the side opposite to the filter 4 with respect to the projections 15*a*. Each of the small projections 16*a* was shaped like a circular column having a bottom diameter of 0.5 mm and a height of 0.1 mm. The liquid was injected in the same manner as in Example 1.

Image recording was performed using the above liquid discharge head 1, and an amount of 90% or more of the total liquid was consumed up. No overflow of the liquid from tank body 11 was observed during the liquid injection.

Example 3

In the present example, the liquid discharge head 1 illustrated in FIG. 3D was prepared. The liquid tanks 10 in Example 1 and Example 3 were the same except that the projections 15*a* were arranged differently and each projection 15*a* in Example 3 had surface irregularities. The liquid was injected in the same manner as in Example 1.

Image recording was performed using the above liquid discharge head 1, and an amount of 90% or more of the total liquid was consumed up. No overflow of the liquid from tank body 11 was observed during the liquid injection.

Example 4

In the present example, the liquid discharge head 1 illustrated in FIG. 3C was prepared. The liquid tanks 10 in Example 1 and Example 4 were the same except that the projections 15*a* were arranged differently and small projections 16*a* were provided around the filter 4 in Example 4. Each of the small projections 16*a* was shaped like a cone having a bottom diameter of 0.08 mm and a height of 0.08 mm. The liquid was injected in the same manner as in Example 1.

Image recording was performed using the above liquid discharge head 1, and an amount of 90% or more of the total liquid was consumed up. No overflow of the liquid from tank body 11 was observed during the liquid injection.

Example 5

In the present example, the liquid discharge head 1 similar to that of Example 3 was prepared. In Example 5, however, the surface of each projection 15*a* was irradiated with UV light (60 $mW/cm^2$/3.0 seconds).

Image recording was performed using the above liquid discharge head 1, and an amount of 90% or more of the total liquid was consumed up. No overflow of the liquid from tank body 11 was observed during the liquid injection.

Comparative Example

In the comparative example, the liquid discharge head 1 was similar to that of Example 1 except that the projection group 15 was not provided.

Image recording was performed using the above liquid discharge head 1, and an approximate amount of 90% of the total liquid was consumed up. In this case, however, a large amount of liquid overflow from the tank body 11 was observed during the liquid injection.

According to the present disclosure, the liquid discharge head can improve the product reliability and can reduce the manufacturing cost.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-074667, filed Apr. 28, 2022, which is hereby incorporated by reference herein in its entirety.

What is claimed is:

1. A liquid discharge head, comprising:

a recording-element substrate configured to discharge a liquid;

a cuboid-like liquid tank configured to support the recording-element substrate and to store the liquid to be discharged from the recording-element substrate; and an absorbent accommodated in a compressed state in the liquid tank and configured to absorb and hold the liquid, wherein multiple projections are formed on a bottom of the liquid tank, and wherein as viewed in plan in a direction orthogonal to the bottom, the projections are disposed so as to surround or straddle an injection position at which the liquid is injected into the absorbent using an injection needle.

2. The liquid discharge head according to claim 1, wherein the bottom of the liquid tank is shaped like a rectangle, and wherein the injection position is positioned at a center of the absorbent in a transverse direction of the bottom as viewed in plan.

3. The liquid discharge head according to claim 2, wherein the projections are not positioned on a straight line drawn so as to pass through the injection position in the transverse direction of the bottom.

4. The liquid discharge head according to claim 3, wherein the projections are not positioned within a region of ±5 degrees from the straight line with the injection position being at the center.

5. The liquid discharge head according to claim 4, wherein when a distance between any one of the projections positioned most closely to a side wall of the liquid tank and the side wall is denoted by L and a length of the bottom in the transverse direction thereof is denoted by W as viewed in plan, $L \geq W/9$ holds for the projections.

6. The liquid discharge head according to claim 2, wherein as viewed in plan, the projections are disposed symmetrically with respect to a center line of the bottom extending in a longitudinal direction thereof.

7. The liquid discharge head according to claim 1, wherein the bottom of the liquid tank is shaped like a square, and wherein as viewed in plan, the projections are disposed radially with the inject ion position being at a center.

8. The liquid discharge head according to claim 1, wherein any one of the projections is not disposed at a position overlapping the injection position as viewed in plan.

9. The liquid discharge head according to claim 1, wherein multiple other projections are formed on the bottom of the liquid tank and each of the other projections is smaller than any one of the projections.

10. The liquid discharge head according to claim 9, further comprising:

a filter disposed at the bottom of the liquid tank and configured to capture foreign matter in the liquid supplied from the liquid tank to the recording-element substrate, wherein the other projections are disposed on the bottom on a side opposite to a side on which the filter is disposed with respect to the projections.

11. The liquid discharge head according to claim 9, further comprising:

a filter disposed at the bottom of the liquid tank and configured to capture foreign matter in the liquid supplied from the liquid tank to the recording-element substrate, wherein the other projections are disposed on the bottom around the filter.

12. The liquid discharge head according to claim 1, wherein each of the projections is shaped like a cone or a pyramid.

13. The liquid discharge head according to claim 1, wherein each of the projections has surface irregularities.

14. The liquid discharge head according to claim 1, wherein the projections includes at least one projection subjected to liquid-philic treatment.

15. The liquid discharge head according to claim 1, wherein multiple injection positions are set in the absorbent, and the projections are disposed for each of the injection positions.

16. A liquid discharge head, comprising:

a recording-element substrate configured to discharge a liquid;

a cuboid-like liquid tank configured to support the recording-element substrate and to store the liquid to be discharged from the recording-element substrate; and an absorbent accommodated in a compressed state in the liquid tank and configured to absorb and hold the liquid, wherein a puncture is present on a surface of the absorbent positioned opposite to a surface of the absorbent facing a bottom of the liquid tank, the puncture being formed due to an injection needle for injecting the liquid into the liquid tank being inserted into the absorbent, wherein multiple projections are formed on the bottom of the liquid tank, and wherein as viewed in plan in a direction orthogonal to the bottom, the projections are disposed so as to surround or straddle the puncture.

17. A method of manufacturing a liquid discharge head, the method comprising:

providing a cuboid-like liquid tank configured to support a recording-element substrate that discharges a liquid and configured to store the liquid to be discharged from the recording-element substrate;

installing an absorbent in a compressed state into the liquid tank, the absorbent being configured to absorb and hold the liquid; and inserting an injection needle into the absorbent and injecting the liquid through the injection needle into the liquid tank, wherein the providing the liquid tank includes forming multiple projections on a bottom of the liquid tank at positions surrounding or straddling a position at which the injection needle is to be inserted in the absorbent as viewed in plan in a direction orthogonal to the bottom.

* * * * *